Aug. 4, 1959     A. E. OWEN     2,898,240

PHOTO-CONDUCTIVE CELL

Filed Sept. 23, 1957

INVENTOR
ALAN ERNEST OWEN

BY
AGENT

United States Patent Office 2,898,240
Patented Aug. 4, 1959

2,898,240

PHOTO-CONDUCTIVE CELL

Alan Ernest Owen, West Bridgeford, Nottingham, England, assignor to North American Philips Company, Inc., New York, N.Y., a corporation of Delaware Application September 23, 1957, Serial No. 685,727

Claims priority, application Great Britain September 27, 1956

4 Claims. (Cl. 117—211)

The present invention relates to photo-conductive cells.

According to the present invention, a method of manufacturing a photo-conductive cell comprises the step of depositing photo-conductive material onto a support from a solution or mixture of solutions by addition of a precipitating agent and agitating the liquid during deposition by setting up ultrasonic vibrations therein.

The method according to the present invention not only provides more reproducible cells, presumably due to the more intimate mixing, but may also provide more sensitive cells as compared with cells manufactured otherwise in a similar fashion but with the use of paddle-stirring.

It is preferred that the distribution of ultrasonic energy in the reaction vessel in which deposition is taking place be substantially uniform.

The method according to the present invention is applicable to the manufacture of lead sulphide cells, in which case, for example, deposition may be effected by adding an aqueous alkaline solution to a mixture of aqueous solutions of lead acetate and thiourea. The method is also applicable to the manufacture of lead selenide cells and cells comprising a mixture of lead sulphide and lead selenide.

Figure 1:
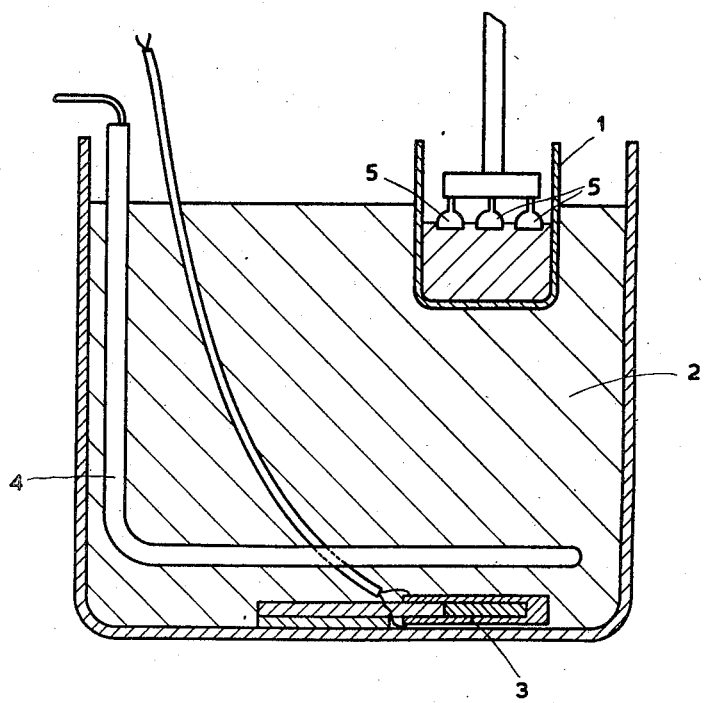
Figure 2:
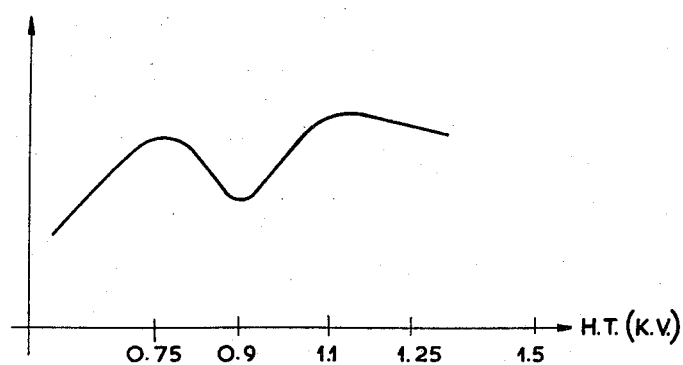

One embodiment of a method according to the present invention will now be described, by way of example, with reference to the diagrammatic drawing accompanying the specification, in which:

Figure 1 shows, in side elevation, an apparatus for carrying out the method and, Figure 2 is a graph showing the relationship of the voltage applied in the ultrasonic generator to the signal produced.

Referring now to Figure 1, an apparatus for carrying out a method according to the present invention comprises a glass beaker 1 the bottom of which is thin so that ultrasonic energy can be transmitted with small loss. The beaker 1 is held in a water bath 2, immediately above a crystal 3 of barium titanate acting as a source of ultrasonic energy. The apparatus also comprises a heater element 4.

9 ccs. of a lead acetate solution prepared by dissolving 400 g. of lead acetate in 1 litre of 1% acetic acid and 18 ccs. of an aqueous thiourea solution prepared by dissolving 20 g. of thiourea in 1 litre of distilled water were poured into the beaker 1 and the beaker 1 arranged so that the level of the mixture of solutions was below the level of the water in the water bath 2. The whole was heated by the heater element 4 to a temperature of about 28° C. Glass buttons 5 of "Hysil" glass, having a flame polished surface and forming supports for deposited lead sulphide were then placed in position with their surfaces just immersed in the mixture of solutions in the beaker 1. 0.75 cc. of 100% hydrazine hydrate were then added to the mixture of solutions and an ultrasonic generator connected to the crystal 3 was switched on.

After five minutes 3 ccs. of a 14 N solution caustic soda was added slowly to the contents of the beaker 1 and the deposition reaction allowed to proceed for ten minutes. Starting with the temperature of about 28° C., the temperature was found to rise to about 32° C. due to the dissipation of ultrasonic energy.

The buttons with deposited lead sulphide were then removed from the beaker 1 and washed in distilled water. Electrodes were then provided by painting the cells with a colloidal suspension of graphite in water and the cells baked at 75° C. until maximum signal/noise value was reached; the baking took about 16 days.

With a high tension voltage of 1.1 kv. supplied to the anode of the oscillator tube of the ultrasonic generator used and by depositing on glass buttons presenting smooth surfaces of 36 sq. mms. area, 21 cells were made giving an average signal of 104 $\mu$v. with a peak at 190 $\mu$v. Signal/noise ratios were usually in the region 70/1 to 100/1 with a peak at 120/1. Cells prepared without ultrasonic agitation but otherwise by an exactly similar method of manufacture gave a usual signal of about 50 $\mu$v. to 60 $\mu$v. with a peak of 80 $\mu$v. The figures given above were measured for each cell across, 1 megohm load connected in series with the cell, the voltage across the cell being 100 volts, the cells being irradiated from a black-body source at 200° C. having a source aperture of 3 mm. diameter, the cell being placed 20 cms. from the source and the radiation being chopped at a frequency of 800 cycles/sec.

The generator and barium titanate crystal used have a fixed frequency of 1 mcycle/sec. and the ultrasonic power was variable by variation of the high tension voltage (0–2 kv.). The optimum results were obtained with the high tension voltage at 1.1 kv. Figure 2 shows the variation in signal of cells (signal) obtained with varying high tension voltages (H.T.). Signal/noise ratio varies similarly in accordance with the high tension voltage; cells prepared with the high tension voltage setting at 1.1 kv. had the highest signal/noise ratio as the noise was lower.

In general, the conditions of ultrasonic frequency, ultrasonic power, temperature and concentration of reagents will be interdependent and experiment is necessary in order to determine the optimum values of power, temperature and concentrations at any given frequency and to determine the frequency for best results for any purpose.

Although the description given above relates to lead sulphide cells, the method according to the invention is not limited thereto, but may be used in the preparation of other photo-conductive cells, for example, for lead selenide cells.

A further advantage which is provided by the method according to the invention that, as far as lead sulphide is concerned, in general single-layer deposition may be effected on smooth surfaces whereas previously it has been found necessary to roughen glass before deposition in order to avoid the necessity of depositing in two steps.

What is claimed is:

1. The method of depositing photoconductive material onto a support comprising the steps of immersing said support in a solution containing photoconductive material, adding a precipitating agent for the photoconductive material to thereby cause the photoconductive material to deposit on said support and setting up ultrasonic vibrations in said solution to agitate said solution at ultrasonic frequencies during the course of said deposition.

2. The method of claim 1 in which the photoconductive material is lead sulfide.

3. The method of claim 1 in which the photoconductive material is lead selenide.

4. The method of claim 1 in which the photoconductive material is a mixture of lead selenide and lead sulfide.

References Cited in the file of this patent

UNITED STATES PATENTS 2,657,668     Maier _____ Nov. 3, 1953
2,809,132     Bloem _____ Oct. 8, 1957